Dec. 26, 1967  R. L. LEWIS ETAL  3,360,004
PRESSURE PROPORTIONING VALVE
Filed Sept. 7, 1965  2 Sheets-Sheet 1

INVENTORS
RICHARD L. LEWIS
CHARLES M. BARNES
DONALD W. SMITH
BY-
Sheldon F. Raye
ATTORNEY INVENTORS
RICHARD L. LEWIS
CHARLES M. BARNES
DONALD W. SMITH
BY-
Sheldon F. Raizes
ATTORNEY

United States Patent Office 3,360,004
Patented Dec. 26, 1967

3,360,004
PRESSURE PROPORTIONING VALVE
Richard L. Lewis, Charles M. Barnes, and Donald W. Smith, St. Joseph, Mich., assignors to The Bendix Corporation, a corporation of Delaware
Filed Sept. 7, 1965, Ser. No. 485,215
6 Claims. (Cl. 137—493)

This invention concerns a valve for proportioning actuating pressure to different sets of brakes located on different axles of a vehicle.

It is an object of this invention to provide a braking system with a proportioning valve designed to communicate equal actuating pressure to front and rear brakes until a predetermined pressure is reached and thereafter effects a slower rate of actuating pressure increase in the rear brakes than in the front brakes. The predetermined actuating pressure value and the rate of increase of actuating pressure to the rear brakes is designed so that the braking load exerted on the front wheels will be in balance with the braking load exerted on the rear wheels in accordance with the shifting of load from the rear axle to the front axle due to deceleration.

Figure 1:
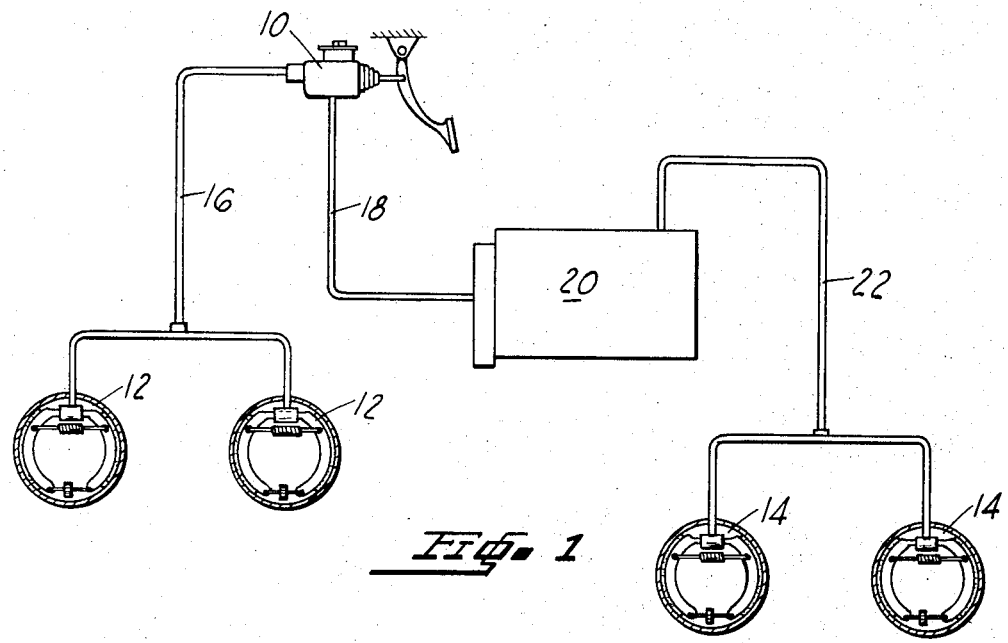
Figure 3:
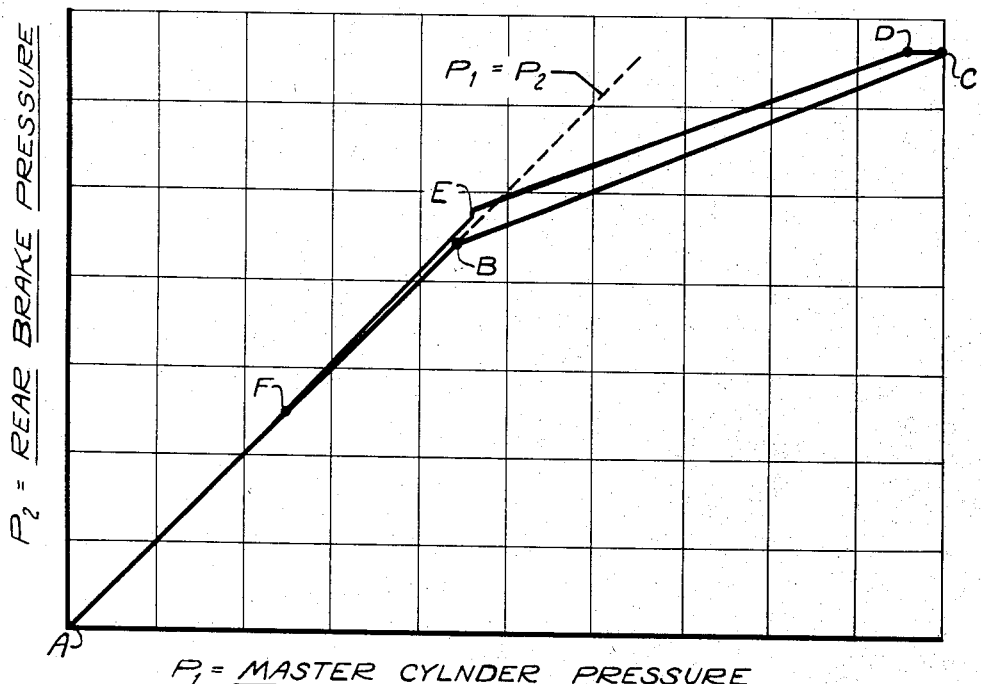
Figure 2:
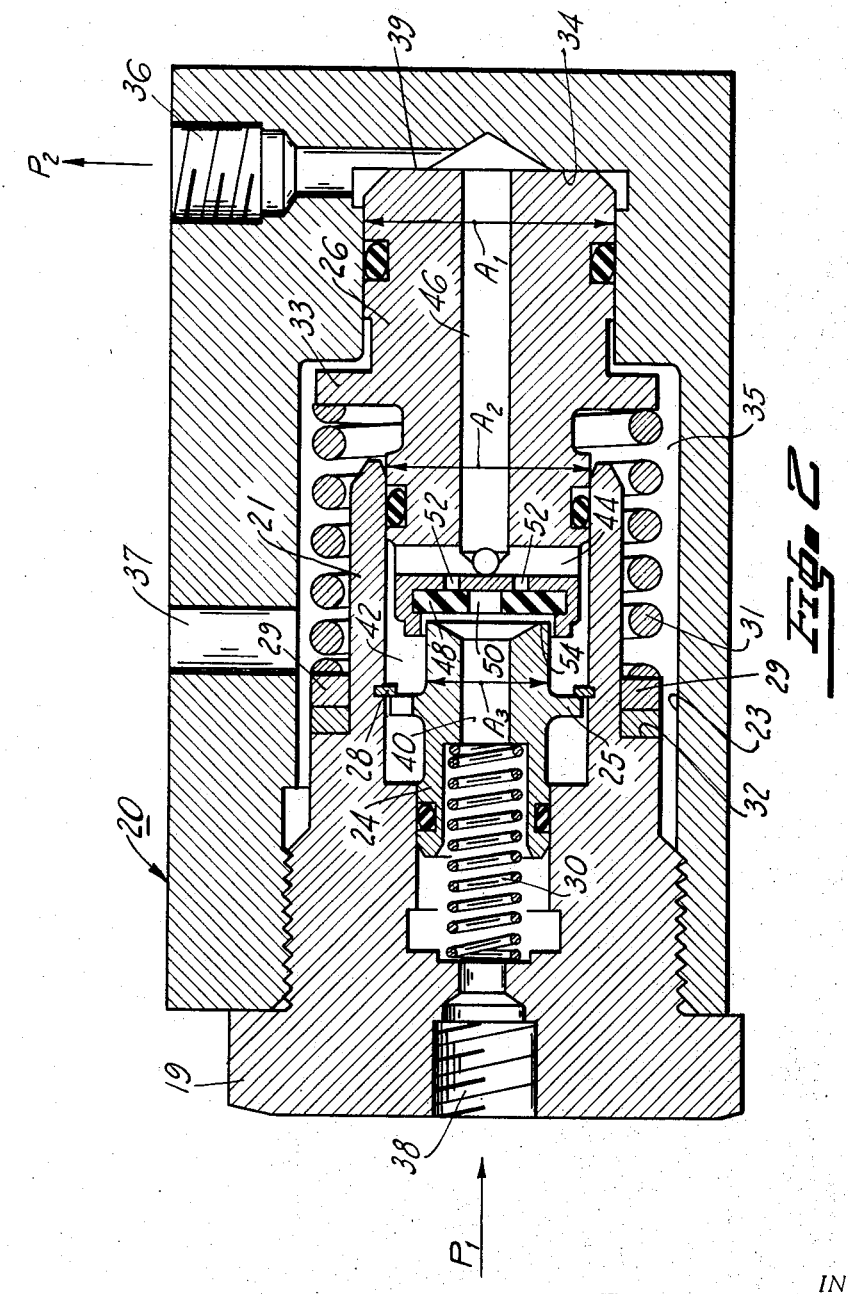

Other objects of the invention will become apparent to those skilled in the art from the following description with reference to the drawings wherein:

FIGURE 1 is a schematice view of a braking system;
FIGURE 2 is a cross sectional view of a proportioning valve; and
FIGURE 3 is a graph depicting the operational characteristics of the valve of FIGURE 2.

Referring to FIGURE 1, a master cylinder 10 of the split system type, is provided for actuating a pair of front brakes 12 and a pair of rear brakes 14. A conduit 16 connects one actuating chamber of the master cylinder with the wheel cylinders of the front brakes 12 and a conduit 18 connects the other actuating chamber of the master cylinder with a pressure proportioning valve 20 which in turn is connected to a conduit 22 to the wheel cylinders of the rear brakes 14.

An inlet fitting 19 is threadedly secured to one end of the valve housing 20 and has a tubular portion 21 extending into a multi-diameter bore 23 in the housing. The tubular portion 21 slidably receives therein a plunger 24 and an end portion of a plunger 26. The other end of the plunger 26 is slidably received in the bore 23. The plunger 24 contains an annular flange 25 for engaging a stationary snap ring 28 secured to the fitting 19. A spring 30 is compressed between the plunger 24 and the fitting 19 for urging the plunger 24 into engagement with the snap ring 28 and a varibale rate spring 31 is compressed between a pair of spacer washers 29, supported on shoulder 32 of the fitting 19 and a flange 33 for urging the plunger 26 into engagement with the end 34 of the bore 23. An outlet port 36 in the valve housing is communicated to an inlet port 38 in the fitting 19 by an inlet passage 40 in the plunger 24, chamber 42, cross bore 44 and longitudinal passage 46 in the plunger 26. The chamber 35 in which spring 31 is located is communicated to atmosphere by vent 37 to allow stroking of the plunger 26 to the left. The chamber 42, cross bore 44, passage 46 and that portion of the bore 23 which is located between the end surface 39 of the plunger 26 and the end surface 34 of the bore 23 during stroking of the plunger 26 to the left all constitute a variable volume outlet chamber. A check valve is carried by the plunger 26 and comprises a rubber diaphragm 48, having a central opening 50 therein, overlying a pair of ports 52 located on the plunger 26 between the cross bore 44 and the diaphragm 48. Flow may only be passed through the check valve from the outlet passage 46 to the inlet passage 40 since inlet pressure acts on the diaphragm 48 to press the same against the ports 52 to prevent flow from the inlet passage 40 therepast to the outlet passage 46. The right hand end of the plunger 24 comprises an annular edge 54 which is adapted to engage the diaphragm 48 to either close off communication between the inlet passage 40 and the outlet chamber 42 or acts in conjunction with the diaphragm 48 to meter flow from the inlet passage 40 to the outlet chamber 42.

The input pressure $P_1$ acts on an area $A_3$ at the left end of plunger 26 to urge the plunger to the right and the output pressure $P_2$ effectively acts on the left end of the plunger 26 over an annular area $(A_2-A_3)$ to urge the plunger 26 to the right and also acts on the plunger 26 at the right end thereof over an area $A_1$ to urge the plunger 26 to the left. When the piston strokes to the left againts the force of the spring 31, the volume of fluid under output pressure $P_2$ increases by the amount of $$[A_1-(A_2-A_3)]$$

times the length of the stroke. The areas on plunger 24 that are exposed to inlet pressure $P_1$ which acts thereon in a direction to urge movement of the plunger 24 to the left or to the right are equal and accordingly, $P_1$ has no effect on plunger 24. Only the force of the spring 30 effectively acts on the plunger 24 and this force either maintains the flange 25 in engagement with the snap ring 28 or maintains the edge 54 in engagement with the diaphragm 48.

Operation

FIGURE 3 illustrates a typical pressure curve for the pressure proportioning valve 20. The curve is referred to during the following operation description. The equations set forth do not consider friction which must be taken into account when designing the valve.

Upon actuation of the master cylinder 10, fluid under pressure $P_1$ will enter the pressure proportioning valve through the inlet port 38, pass into inlet passage 40, flow past the opening between the annular edge 54 and the diaphragm 48 into outlet chamber 42, cross bore 44, outlet passage 46 and out the outlet port 36 to the rear brakes 14. In this instance, the inlet pressure $P_1$ is equal to the outlet pressure $P_2$ (line A–B). Outlet pressure $P_2$ will act against the effective area $(A_1-A_2)$ on surface 39 to provide a force on the plunger 26 urging the same to the left against the force $F_s$ of the spring 31. When $$P_1A_3+P_2(A_2-A_3)+F_s=P_2A_1$$

the hydraulic pressure $P_2$ acting on the effective area $(A_1-A_2)$ of plunger 26 will overcome the spring 31 (point B) to shift the plunger 26 to the left bringing the diaphragm 48 into engagement with the annular edge 54 to close off communication between the inlet passage 40 and the outlet chamber 42. At this point (B), the plunger 26 moves back and forth metering flow from the inlet passage 40 past the edge 54 into the outlet chamber 42 and thus to rear brakes with the inlet pressure $P_1$ from the master cylinder increasing at a greater rate than the outlet pressure $P_2$ increases (line B–C). Upon release of brake pressure in the master cylinder, the inlet pressure $P_1$ will decrease permitting the force effected by the outlet pressure $P_2$ acting on the plunger 26 to overcome friction (line C–D) and then move the plunger 26 and thereby the plunger 24 to the left against the force of springs 31 and 30 whereby the outlet chamber will be expanded resulting in pressure $P_2$ being decreased (line D–E). The plungers 26 and 24 will stroke to the left until the pressure $P_1$ falls below pressure $P_2$ by an amount of pressure differential which is required to lift the diaphragm 48 off its seat to open the check valve. At this point (E), the diaphragm 48 is forced off the end of the plunger 26 allowing fluid to flow through the ports 52 and 50 directly into the inlet passage 40 back to the master cylinder (line E–F). While flow is passing through the check valve, the hydraulic forces acting on plunger 26 will be such that the spring 31 will begin to return the plunger 26 back into engagement with the end surface 34. In the meantime the spring 30 will maintain engagement between the edge 54 and the diaphragm 48 until the flange 25 engages the snap ring 28 (point F). Further movement of the plunger 24 to the right will be stopped by the snap ring 28 resulting in edge 54 becoming disengaged from diaphragm 48 and opening communication between the inlet passage 40 and outlet chamber 42 (line F-A).

It can be seen from the chart that upon release of the braking pressure, pressure $P_2$ decreases practically at the same rate it increased upon brake application. In other words, the same pressure $P_1$ in the master cylinder upon either brake application or brake release will produce the same or substantially the same corresponding pressure $P_2$ at the rear brakes.

From the above, it can readily be seen that the above objects are achieved by the invention disclosed herein. It is our intention to include within the scope of the following claims all equivalent applications of the invention whereby the same or substantially the same results may be obtained.

We claim:

1. A pressure proportioning device comprising:

a housing having a bore therein, a first valve member and a second valve member mounted in said bore for substantial slidable movement therein, said bore including an inlet chamber and an outlet chamber, said second valve member having a first effective area exposed to pressure at said outlet chamber, first passage means carried by said first valve member communicating a second effective area on said second valve member and said outlet chamber with said inlet chamber, said first effective area being so arranged that outlet pressure acting thereon will urge said second valve member in one direction and into engagement with said first valve member, said second effective area being less than said first effective area and so arranged that inlet pressure acting thereon will urge said second valve member in the opposite direction, cooperating valve means on said valve members effective to cut off communication between said first passage means and said outlet chamber in closed position when said valve members engage each other and to communicate said inlet and outlet chambers in open position when said valve members are disengaged from each other, second passage means communicating said outlet chamber to said inlet chamber, check valve means located in said second passage means constructed to allow flow only from said outlet chamber to said inlet chamber, first stop means, first resilient means urging said first valve member in said opposite direction against said first stop means, second stop means, second resilient means stronger than said first resilient means urging said second valve member in said opposite direction against said second stop means, said valve members being so constructed that when each are simultaneously against said stop means, said valve means is open, said second valve member and said outlet chamber being so constructed and arranged to define an expansible chamber when said second valve member is moved in said one direction away from said second stop means.

2. The structure as recited in claim 1 wherein said second passage means is located in said second valve member, said check valve means is carried by said second valve member and exposed to said first passage means, said second passage means being communicated to said first passage means when said check valve means allows flow therepast.

3. A pressure proportioning device comprising:

a housing having a bore therein, a first valve member and a second valve member mounted in said bore for substantial slidable movement therein, said bore including an inlet chamber and an outlet chamber, said second valve member having a first effective area exposed to pressure at said outlet chamber and a second effective area exposed to pressure at said inlet area, said first effective area being so arranged that outlet pressure acting thereon will urge said second valve member in one direction and into engagement with said first valve member, said second effective area being less than said first effective area and so arranged that inlet pressure acting thereon will urge said second valve member in the opposite direction, said valve members defining passage means therebetween communicating said inlet chamber with said outlet chamber, cooperating valve means on said valve members located in said passage means effective to cut off communication between said inlet chamber and said outlet chamber in closed position when said valve members engage each other and to communicate said inlet and outlet chambers in open position when said valve members are disengaged from each other, second passage means communicating said outlet chamber to said inlet chamber, check valve means located in said second passage means constructed to allow flow only from said outlet chamber to said inlet chamber, first stop means, first resilient means urging said first valve member in said opposite direction against said first stop means, second stop means, second resilient means stronger than said first resilient means urging said second valve member in said opposite direction against said second stop means, said valve members being so constructed that when each are simultaneously against said stop means, said valve means is open, said second valve member and said outlet chamber being so constructed and arranged to define an expansible chamber when said second valve member is moved in said one direction away from said second stop means.

4. The structure as recited in claim 3 wherein said second passage means is located in said second valve member, said check valve means is carried by said second valve member and exposed to said first passage means, said second passage means being communicated to said first passage means when said check valve means allows flow therepast.

5. The structure as recited in claim 4 wherein said check valve means comprises a resilient member carried on one end of said second valve member, said second valve member having port means communicating said second passage means to said resilient member, said resilient member having port means communicated to said first passage means offset from said second valve member port means for communicating said second passage means to said first passage means, said resilient member being so arranged that it is pressed by inlet pressure against said one end of said second valve member cutting off communication between said port means.

6. The structure as recited in claim 5, wherein said cooperating valve means on said valve members comprises an annular edge on one end of said first valve member and said resilient member, said annular edge surrounding said port means and engageable with said resilient member to cut off communication between said first passage means and said outlet chamber.

No references cited.

M. CARY NELSON, *Primary Examiner.*

J. MILLER, *Assistant Examiner.*